(12) United States Patent
Holmberg

(10) Patent No.: US 6,339,902 B1
(45) Date of Patent: Jan. 22, 2002

(54) PROPAGATION TRAY

(76) Inventor: Douglas A. Holmberg, 1321 N. Valrico Rd., Valrico, FL (US) 33954

( * ) Notice: Subject to any disclaimer, the term of this patent is extended or adjusted under 35 U.S.C. 154(b) by 0 days.

(21) Appl. No.: 09/541,955

(22) Filed: Apr. 3, 2000

(51) Int. Cl.⁷ .............................................. A01G 9/02
(52) U.S. Cl. ..................................................... 47/87
(58) Field of Search .......................... 42/87, 85, 86; 206/541, 518, 851.1; D9/341; 47/82

(56) References Cited

U.S. PATENT DOCUMENTS

| | | | | |
|---|---|---|---|---|
| 3,872,621 A | * | 3/1975 | Greenbaum | 47/87 |
| 3,889,416 A | * | 6/1975 | Bergeron et al. | 47/86 |
| 3,949,523 A | * | 4/1976 | Lehtipuu | 47/77 |
| 5,127,189 A | * | 7/1992 | Holmberg | 47/87 |
| D358,546 S | * | 5/1995 | Walchek, Jr. et al. | D9/341 |
| 5,419,080 A | * | 5/1995 | Buss et al. | 47/87 |

* cited by examiner

Primary Examiner—Charles T. Jordan
Assistant Examiner—Jordan Lofdahl
(74) Attorney, Agent, or Firm—Arthur W Fisher III

(57) ABSTRACT

A propagation tray configured to receive a plurality of seedlings or root cuttings comprising a tray member having an outer peripheral skirt formed about the periphery thereof and a plurality of propagation cells each having an upper centrally disposed aperture formed in the upper portion thereof inwardly of the outer peripheral skirt to receive a growing media and seedlings or root cuttings therein, a lower centrally disposed drainage aperture formed in the lower portion thereof and a growing media support member formed across the lower centrally disposed drainage aperture to retain the growing media and seedling or root cutting therein.

16 Claims, 3 Drawing Sheets

PROPAGATION TRAY

BACKGROUND OF THE INVENTION

1. Field of the Invention

A propagation tray comprising a tray member having a plurality of propagation cells formed therein to propagate a plurality of seedlings or root cuttings therein.

2. Description of the Prior Art

Numerous efforts have been made to provide or create a proper growing environment for seedlings and root cuttings. The patents most pertinent to applicant's invention are discussed hereinafter.

U.S. Pat. No. 5,127,189 describes a propagation tray configured to receive a plurality of seedlings or the like comprising a tray member having an outer peripheral ledge formed about the periphery thereof and plurality of elongated frustum conical propagation cells each having a centrally disposed aperture formed in the upper portion thereof to receive individual seedlings. A drainage aperture and cell support surface are formed on the lower portion of each elongated frustum conical propagation cell such that the seedling disposed therein is provided drainage and air pruning through the drainage aperture while supported on the ground or other supporting surface by the cell support surfaces.

U.S. Pat. No. 4,658,542 is directed to a portable growing system for propagating seedlings or rooting cuttings comprising an upper propagation tray configured to receive a plurality of seedlings or rooting cuttings and a lower support bench configured to support the upper propagation tray above the ground or other supporting surface. The upper propagation tray comprises a tray member having an outer peripheral support ledge formed about the periphery thereof and plurality of propagation cells each having a centrally disposed aperture formed in the lower portion thereof to receive individual seedlings or rooting cuttings formed inwardly of the outer peripheral support ledge. The lower support bench comprises a pair of side walls held in fixed spaced relationship relative to each other by a pair of end walls and a lattice floor. The upper surfaces of the pair of the side walls and pair of end walls cooperatively forming an upper peripheral support surface to support the outer peripheral support ledge; while, the pair of side walls and the pair of end walls including a plurality of openings formed therein whereby the upper propagation tray is supported within the lower support bench such that the seedlings or rooting cuttings disposed within the plurality of propagation cells are provided drainage and air pruning through the centrally disposed apertures and through the side openings and lattice floor of the lower support bench.

U.S. Pat. No. 4,173,097 relates to containers for the growth of plants including indentations in the bottom and/or side(s) of the container to increase the surface area of the part of the container in contact with the growing media, reduce the average distance a molecule must diffuse in the growing media from roots before encountering a media-air interface and reduce the proportion of relatively water saturated growing media in the containers.

U.S. Pat. No. 4,446,652 discloses a unitary flower pot having a water reservoir at the bottom thereof defined by a bottom wall and a soil support plate positioned above the bottom wall. The soil support plate is hinged to the pot by means of plastic resin from which the pot is formed. The soil support plate and pot are formed from the same material with the support plate at a vertical position in alignment with the axis of the pot so that it can be removed from the mold and then swung downwardly about the hinge to a horizontal position when soil is to be placed in the pot.

U.S. Pat. No. 752,370 shows a flower-pot of clay having a substantially flat bottom with a central drainage hole and a conical tapering side wall the inner face of which near the bottom has a greater taper than that of the corresponding outer face and forms a direct junction with the drainage hole by the inner and outer face intersecting with each other.

U.S. Pat. No. 3,315,410 shows a container of fibrous pulp material comprising a bottom having an upwardly and outwardly flaring side wall connected around the periphery of the bottom. The bottom includes a horizontal center portion the substantially flat plane and a conical spaced above the corner to the portion that extends upwardly from the nter portion. A drainage aperture extends through the horizontal center portion of the bottom through the horizontal center portion of the bottom.

Additional examples of the prior art are found in U.S. Pat. No. 2,599,853; U.S. Pat. No. 3,889,416; U.S. Pat. No. 3,931,694; U.S. Pat. No. 3,949,523; U.S. Pat. No. 4,389,814; U.S. Pat. No. 4,753,037; U.S. Pat. No. 4,962,855; U.S. Pat. No. 5,016,548; French 633293 and United Kingdom 1511256.

SUMMARY OF THE INVENTION

The present invention relates to a propagation tray configured to receive a plurality of seedlings, root cuttings or the like for the propagation of plants or trees.

The propagation tray comprises a tray member including an outer peripherial skirt having a plurality of propagation cells formed inwardly thereof. Each propagation cell comprises an upper centrally disposed aperture, an intermediate potting portion to receive a growing media therein and a lower drainage aperture having a media support member extending across the drainage aperture to retain the growing media within the propagation cell.

Each propagation cell is configured to provide the volume of the growing media together with the media support, drainage, volume of cell, air pruning, and other structural elements that greatly enhances the growth rate of the seedlings or root cuttings.

In use, growing media is placed into each propagation cell with a seedling or cutting. Once the trees or plants have grown to the desired size, the trees or plants and the growing media are removed from the propagation tray and transplanted into the ground or into a large container- Because of the width to height ratio, an optimum volume of media is provided with an optimum degree of drainage so that the upper foliar plant growth extending from the individual propagation cells may be disposed immediately adjacent the other propagation cells without interference, while maximizing desirable root development.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
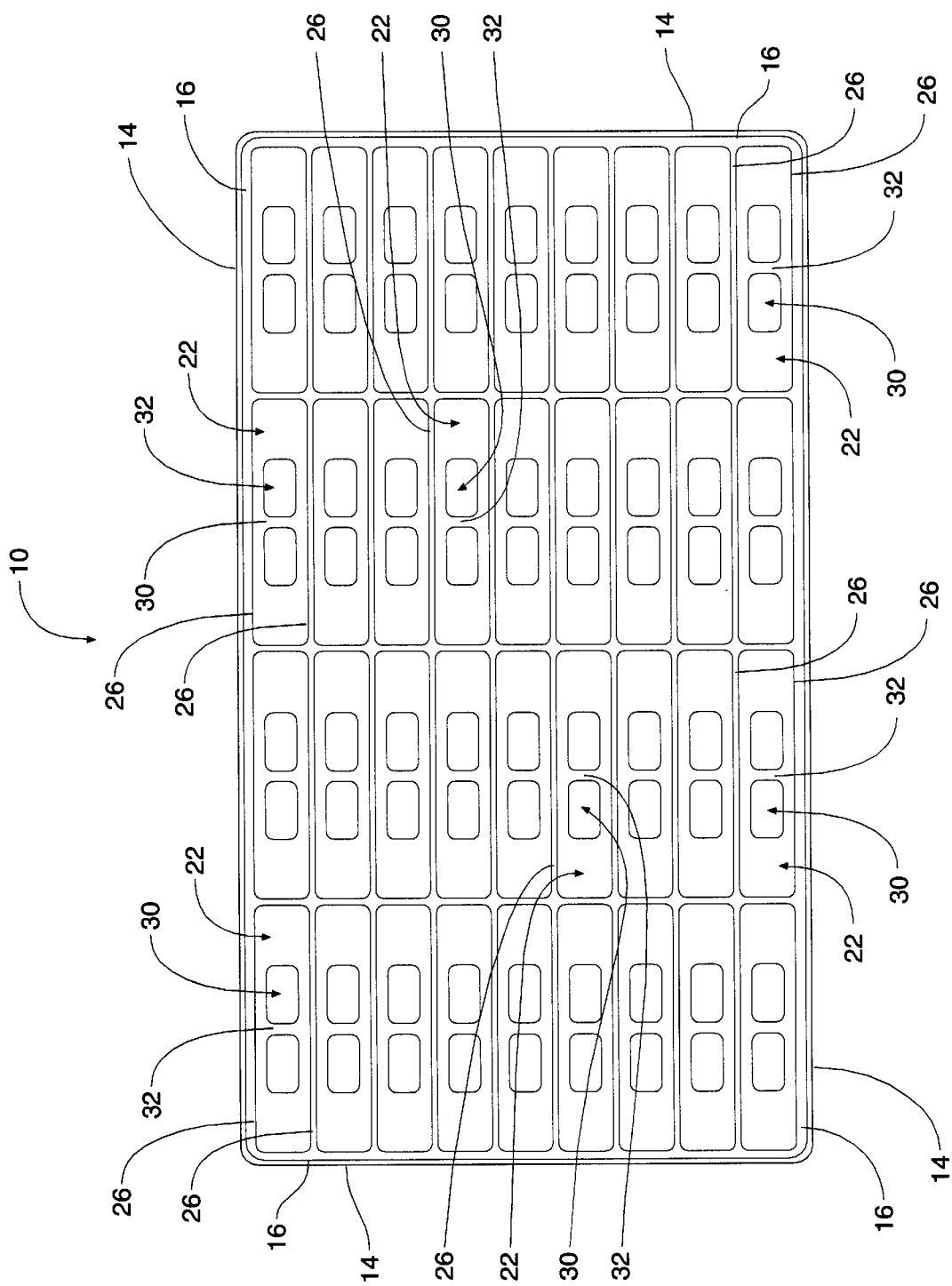
FIG. 1 is a top view of the propagation tray of the present invention.
Figure 2:
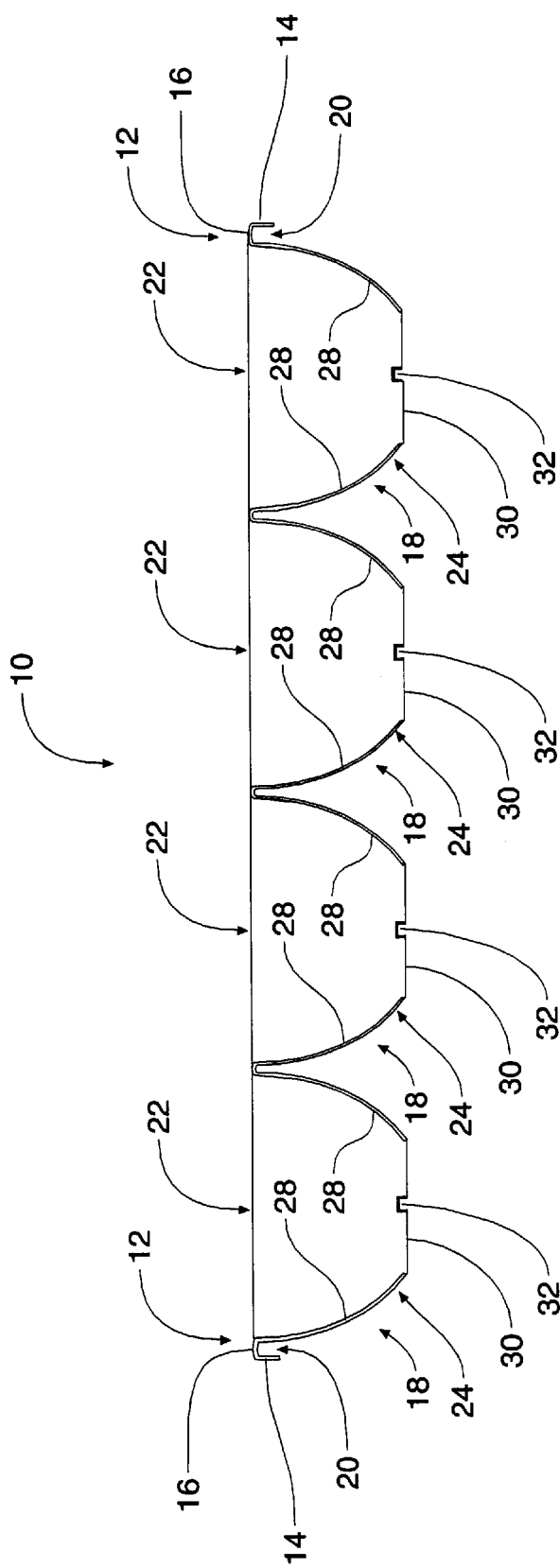
FIG. 2 is a side view of the propagation tray of the present invention.
Figure 3:
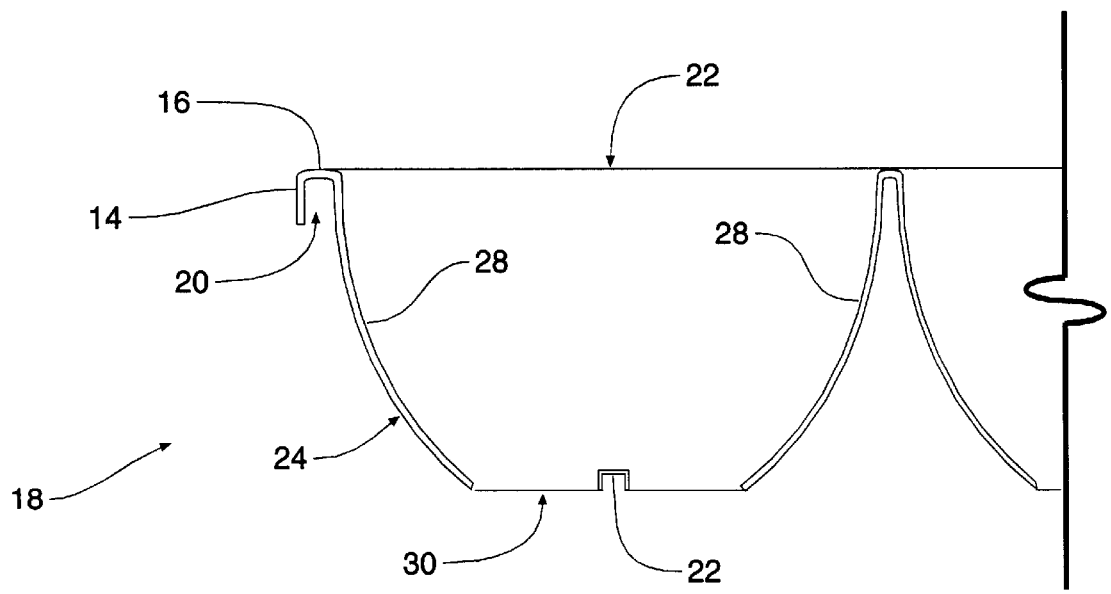
FIG. 3 is a detailed cross-sectional side view of a propagation cell of the present invention.

As shown in FIGS. 1 through 3, the present invention relates to a propagation tray generally indicated as 10 for propagating a plurality of seedlings or root cuttings. The propagation tray 10 comprises a substantially rectangular tray member generally indicated as 12 including a skirt 14 extending downwardly from the outer periphery 16 thereof, a plurality of propagation cells each generally indicated as 18 formed inwardly of the outer periphery 16 and a peripheral groove 20 formed therebetween.

Each propagation cell 18 comprises an upper centrally disposed substantially oblong aperture 22, an intermediate potting portion 24 cooperatively formed by a pair of substantially flat converging side walls each indicated as 26 interconnected by a pair of arcuate end walls each indicated as 28 to receive a growing media therein, a lower centrally disposed substantially oblong drainage aperture 30 formed in the lower portion thereof and a media support member 32 extending across the lower centrally disposed substantially oblong drainage aperture 30 between the mid-portion 36 of each substantially flat converging side wall 26 to retain the growing media within the propagation cell 16.

Each upper centrally disposed substantially oblong aperture 22 is from about 3½ to about 4¾ inches long and about 1+e,fra 114+ee inches wide; while, each lower centrally disposed substantially oblong drainage aperture 30 is from about 2⅛ to about 2⅞ inches long and about ⅞ to about 1 inch wide. Each substantially flat converging side wall 26 is from about 2 to about 3 inches long or deep.

Each propagation cell 18 is configured to provide the volume of the media together with the media support, drainage, volume of cell, air pruning and other structural elements that greatly enhances the growth rate of the seedlings or rooting cuttings. Specifically, the lengths of each upper centrally disposed substantially oblong aperture 22 is about at least 3 times the width thereof, wherein the length of each lower centrally disposed substantially oblong aperture 30 is about at least 3 times the width thereof and wherein the length of each substantially flat converging side wall 26 is greater than the length of the lower centrally disposed substantially oblong aperture 30 and less than the length of the upper centrally disposed substantially oblong aperture 22. Thus multiple seedlings or root cuttings may be placed in each propagation cell 18 to increase the overall yield of the propagation tray 10.

In use, growing media is placed into each propagation cell 18 with seedlings or cuttings. Once the plants have grown to the desired size, the plants and the growing media are removed from the propagation tray 10 and transplanted into the ground or into a larger container. Because of the width to height ratio, an optimum volume of media is provided with an optimum degree of drainage so that the upper foliar plant growth extending from the propagation cells 16 may be disposed immediately adjacent the other propagation cells 16 without interference, while maximizing desirable root development.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described:

What is claimed is:

1. A propagation tray configured to receive a plurality of seedlings or root cuttings comprising a tray member and a plurality of propagation cells each having an upper centrally disposed aperture formed in the upper portion thereof to receive a growing media and seedlings or root cuttings therein, a lower centrally disposed drainage aperture formed in the lower portion thereof and a growing media support member formed across said lower centrally disposed drainage aperture to retain the growing media and seedling or root cutting therein, an intermediate potting portion cooperatively formed by a pair of converging side walls having opposite ends interconnected by a corresponding pair of end walls to receive a growing media therein, said converging side walls are substantially flat and said end walls are substantially arcuate, the length of said propagation cell is at least twice the width thereof, the length of each side upper aperture is at least one and one half times the depth thereof, the area of said upper centrally disposed aperture is at least three times the area of said lower centrally disposed drainage aperture.

2. The propagation tray of claim 1 wherein said upper centrally disposed aperture is substantially oblong in configuration and said lower centrally disposed aperture is substantially oblong in configuration.

3. The propagation cell of claim 2 wherein the area of said upper centrally disposed substantially oblong aperture is at least three times the area of said lower centrally disposed substantially oblong drainage aperture.

4. The propagation cell of claim 1 wherein the lengths of each said upper centrally disposed substantially oblong aperture is about at least 3 times the width thereof, wherein the length of each said lower centrally disposed substantially oblong aperture is about at least 3 times the width thereof and wherein the length of each substantially flat converging side wall is greater than the length of said lower centrally disposed substantially oblong aperture and less than the length of said upper centrally disposed substantially oblong aperture.

5. A propagation tray configured to receive a plurality of seedlings or root cuttings comprising a tray member having a plurality of propagation cells formed thereon, each said propagation cell including an upper aperture formed in the upper portion thereof to receive a growing media and seedlings or root cuttings therein and a lower drainage aperture formed in the lower portion thereof, and a growing media support member formed across said lower drainage aperture to retain the growing media and seedling or root cutting therein wherein each said propagation cell comprises a substantially oblong upper centrally disposed aperture, an intermediate potting portion cooperatively formed by a pair of substantially flat converging side walls having opposite ends interconnected by a corresponding pair of substantially arcuate end walls to receive a growing media therein and a substantially oblong lower centrally disposed drainage aperture formed in the lower portion thereof, and said growing media support member extending across said substantially oblong lower centrally disposed drainage aperture between said corresponding substantially flat converging side walls to retain the growing media within said propagation cell.

6. The propagation tray of claim 5 wherein the length of said propagation cell is at least twice the width thereof.

7. The propagation tray of claim 6 wherein the length of each said upper aperture is at least one and one half times the depth thereof.

8. The propagation cell of claim 5 wherein the area of said upper centrally disposed substantially oblong aperture is at least three times the area of said lower centrally disposed substantially oblong drainage aperture.

9. The propagation tray of claim 5 wherein each said upper centrally disposed substantially oblong aperture is from about 3½ to about 4¾ inches long and about 1¼ inches wide and each said lower centrally disposed substantially oblong drainage aperture is from about 2⅛ to about 2⅞ inches long and from about ⅞ to about 1 inch wide.

10. The propagation tray of claim 9 wherein each said substantially flat converging side wall is about 2 to about 3 inches long.

11. A propagation tray configured to receive a plurality of seedlings or root cuttings comprising a tray member having a plurality of propagation cells formed thereon, each said propagation cell including an upper aperture formed in the upper portion thereof to receive a growing media and seedlings or root cuttings therein and a lower drainage aperture formed in the lower portion thereof, and a growing media support member formed across said lower drainage aperture to retain the growing media and seedling or root cutting therein wherein each said propagation cell comprises an upper centrally disposed aperture, an intermediate potting portion cooperatively formed by a pair of substantially flat converging side walls having opposite ends interconnected by a corresponding pair of substantially arcuate end walls to receive a growing media therein and a lower centrally disposed drainage aperture formed in the lower portion thereof, and said growing media support member extending across said lower centrally disposed drainage aperture between said corresponding substantially flat converging side walls to retain the growing media within said propagation cell.

12. The propagation tray of claim 11 wherein said upper centrally disposed aperture is substantially oblong in configuration and said lower centrally disposed aperture is substantially oblong in configuration.

13. The propagation tray of claim 12 wherein the length of said propagation cell is at least twice the width thereof.

14. The propagation tray of claim 13 wherein the length of each said upper aperture is at least one and one half times the depth thereof.

15. The propagation cell of claim 12 wherein the area of said upper centrally disposed substantially oblong aperture is at least three times the area of said lower centrally disposed substantially oblong drainage aperture.

16. The propagation cell of claim 5 wherein the lengths of each upper centrally disposed substantially oblong aperture is about at least 3 times the width thereof, wherein the length of each lower centrally disposed substantially oblong aperture is about at least 3 times the width thereof and wherein the length of each substantially flat converging side wall is greater than the length of the lower centrally disposed substantially oblong aperture and less than the length of the upper centrally disposed substantially oblong aperture.

\* \* \* \* \*